United States Patent Office 3,136,601
Patented June 9, 1964

3,136,601
PROCESS OF MANUFACTURING PURE ALUMINUM OXIDE FROM ALUMINUM ORES
Jean Mercier, Grenoble, France, assignor to Pechiney, Paris, France
No Drawing. Filed Oct. 31, 1960, Ser. No. 65,934
3 Claims. (Cl. 23—142)

This invention relates to aluminum oxide and to a method for the manufacture of same and it relates more particularly to a new and improved carbothermic method for the manufacture of substantially pure aluminum oxide or corundum.

This invention is a continuation-in-part of my copending application Serial No. 759,391, filed September 8, 1958, now abandoned, and entitled "Process of Manufacturing Pure Aluminum Oxide and Resultant Product."

As pointed out in the aforementioned copending application, it is known to manufacture corundum by reduction of bauxite in an electric furnace to produce lumps of corundum which are then transformed into grains for use as an abrasive. Such processes are generally carried out at a temperature below 1,950° C. and a product is secured in which the aluminum oxide content seldom exceeds 97 percent by weight.

It is also known that, when abrasive corundum is produced of bauxite having a low iron content, iron can be added to the charge generally in the form of iron oxides, thereby to make use of a feed formulated of a mixture of bauxite, coke, iron oxide and scrap iron. This is done not only for the purpose of providing a sufficient quantity of iron for transformation of the metallic impurities into iron alloys, but also to be able subsequently to effect the magnetic separation of the particles of silicon which remain occluded in the corundum in the form of a magnetic iron alloy.

Insofar as I am aware, the processes heretofore developed do not make is possible to produce a relatively pure corundum having a high content of aluminum oxide by a carbothermic process.

It is an object of this invention to provide a semi-continuous process for the manufacture of relatively pure aluminum oxide which may have a purity of 99.5 percent by weight or more of aluminum oxide by reduction of aluminum ores in an electric furnace.

It is another object to provide a process for manufacturing pure aluminum oxide by the reduction of aluminum ores with carbon in an electric furnace consisting:

(1) In carrying out the said reduction at a temperature above 2,000° C. and in the presence of a definite and controlled excess of carbon;
(2) In eliminating globules of iron alloys, maintained in suspension in the midst of the aluminum oxide, by adding to the molten bath—which is carefully heat insulated—definite quantities of non-oxidized iron turnings;
(3) In tapping this bath, while eliminating the excess of carbon and traces of formed aluminum carbide by the action of an oxygen-containing gas, and solidifying the pure aluminum oxide in the form of fine spherical particles by atomization (spraying) and projection into water.

These and other objects of this invention will hereinafter appear from the following description.

The process of this invention can best be illustrated by referring to the following examples setting forth the practice of this invention in the manufacture of relatively pure spherical particles of aluminum oxide.

Example 1

Into a single phase electric furnace of 150 kw., there is charged a mixture of 100 kg. of bauxite containing 68 percent by weight $Al_2O_3$, 18 percent by weight $Fe_2O_3$ and about 7 percent by weight $SiO_2$, and 8 kg. reducing carbon. The furnace is filled up to the pouring (tapping) lip. The bath which is molten when heated to reaction temperature between 2,100 and 2,200° C., contains 94 to 95 percent $Al_2O_3$.

Several hours before tapping, 2 kg. of additional carbon are added in order to perfect the reduction reactions. The latter is controlled by means of an iron rod which is rapidly plunged into the molten corundum. If the color of the corundum adhering to the rod runs from dark gray to black, the reduction is completed.

All trace of bauxite on the surface of the bath is eliminated by adding, for this purpose, a layer of powdered alumina or of already purified corundum. When the layer of bauxite has melted and there remains on the surface nothing but alumina, there is introduced into the bath non-oxidized iron turnings at a rate of about 60 kg. per ton of liquid bath. This mass of turnings, which is heat insulated by the alumina, melts and traverses the bath to entrain the fine drops of Fe–Si still in suspension.

The oxidation of excess carbon and traces of formed aluminum carbide is carried out simultaneously with the granulation by blowing a powerful compressed air jet onto the liquid stream at the moment when the molten aluminum oxide leaves the tapping lip of the furnace. The resultant grains, which are in the form of hollow spheres, are collected in a double-walled aluminum tunnel provided with water circulation for cooling and dropped, while still in a red state, into a powerful water stream which, while quenching the aluminum oxide particles, leads the particles into an aluminum trough and completes the oxidation of the excess carbide which, for the most part, has already taken place in the air current.

The grains are then dried and submitted to a mechanical classification. The resultant product has the following analysis:

|  | Minimum content, percent | Average content, percent |
|---|---|---|
| Si | 0.005 | 0.05 |
| Fe | 0.02 | 0.05 |
| Ti | 0.15 | 0.20 |
| CaO | 0.10 | 0.30 |
| MgO | 0.10 | 0.20 |
| $Al_2O_3$ | 99.6 | 99.2 |

The corundum can be used as such if the content of CaO and MgO is not harmful. Nevertheless, it is possible to eliminate over 90 percent of these impurities by washing the granules with dilute hydrochloric acid.

The content of CaO and MgO and $Al_2O_3$ becomes as follows:

|  | Minimum content, percent | Average content, percent |
|---|---|---|
| CaO | 0.01 | 0.03 |
| MgO | 0.01 | 0.02 |
| $Al_2O_3$ | 99.78 | 99.65 |

Example 2

In a three-phase electric furnace of 400 kw., there is charged a mixture of bauxite containing 70 percent $Al_2O_3$, 100 kgs.; reducing carbon, 8 kgs.; magnesia containing 80 percent MgO, 1.75 kgs. The furnace is filled to the tapping lip and the charge is heated to a temperature above 2,000° C. but below 2,200° C. for reaction. Resultant melt will be found to contain between 94 to 95 percent $Al_2O_3$.

Several hours before tapping, 3 to 4 kgs. of additional carbon are introduced in order to complete the reduction. The latter is controlled by an iron rod which is rapidly plunged into the fused corundum. If the color of the corundum adhering to the rod runs from dark gray to black, then the reduction reaction is completed.

All trace of bauxite on the surface of the bath is eliminated by adding, for this purpose, a layer of powdered alumina or purified corundum. When the layer of bauxite has melted and only alumina remains on the surface, there is then introduced into the bath non-oxidized iron turnings in amounts coresponding to 60 kgs. per ton of liquid bath. These turnings, heat insulated by the alumina, melt, and, while traversing the bath, entrain any still suspended particles of Fe–Si.

It should be noted that during these operations, it is desirable to avoid cooling of the bath in order to maintain a fluidity which will permit ready settling for separation as by decantation. The addition of magnesium, which lowers the fusion point, enables this fluidity to be maintained and contributes greatly to the obtainment of a relatively pure product. The oxidation of excess carbon and traces of formed aluminum carbide is achieved simultaneously with the granulation of the product by blowing a strong jet of compressed air onto the liquid stream as it leaves from the pouring lip of the furnace. The grains obtained in the form of hollow spheres are collected in an aluminum tunnel having double walls with water circulation for cooling. The grains fall while still in a red hot state into a strong current of water which cools the particles by quenching and leads them into an aluminum trough and completes the oxidation of the excess carbide most of which has already been achieved by the air current.

These grains are then dried and submitted to a mechanical classification. The resulting corundum has the following analysis:

| | Percent |
|---|---|
| Si | 0.05 |
| Fe | 0.04 |
| Ti | 0.30 |
| CaO | 0.20 |
| MgO | 1.8 |
| $Al_2O_3$ | 97.61 |

If necessary, all or part of the contained lime and magnesia can be removed from the particles by washing with hydrochloric acid.

With a furnace of 400 kw. reactions can be carried out continuously to produce from 1,500 to 1,800 kgs. of granulated corundum per 24 hours. About every 2 days, the iron alloys settling to the bottom of the furnace can be tapped by a second tapping lip located at the bottom side of the furnace.

I have established that in order completely to reduce the oxides of iron and of silicon contained in the ores of alumina without substantially reducing the aluminum oxide, use should be made of an amount of reducing carbon slightly in excess of the stoichiometric amount required for reaction with all of the metal oxides present in the ore. Besides, in accordance with the practice of this invention, the amount of reducing carbon should be in excess of the order of 35 to 50 percent by weight based upon the stoichiometric quantity for the reduction of the iron and silicon oxides present in the ore.

While it is desirable to make use of an excess of reducing carbon, it is important to separate the carbon additions into a first increment which is admixed with the ore in an amount sufficient to reduce substantially the silicon and iron oxides but which may not be in excess of that required to reduce all of the other oxides, not counting aluminum oxide, present as impurities, including such additional oxides as titanium oxide, calcium oxide, magnesium oxide and the like; and a further increment which is added separate and apart from the ore near the end of the carbothermic reaction in an amount which, when added to the amount of carbon previously added, is in slight excess with regard to the total of the oxide impurities including not only the iron and silicon oxides but the titanium, calcium and magnesium oxides as well.

It has been found that when the total increment of the carbon is added in admixture with the ore for the reduction reaction, some portions of the carbon will be burned off and thus not available for reaction. A further portion may be used to reduce part of the aluminum oxide such that the amount that remains for reduction of the impurities in the ore is generally insufficient to achieve a complete reduction. Thus impure aluminum oxide can be expected. When sufficient excess of carbon is added with the ore to compensate for that which is burned off or which might indesirably be used in the reduction of aluminum oxide, it becomes difficult to maintain the melt at a temperature in excess of 2,000° C., such as is desired in the practice of this invention for effective separation of impurities. Instead, a melt is secured which is of increasing viscosity from the bottom such that it becomes practically impossible to pour from the furnace thus making it necessary to destroy the furnace.

On the other hand, when an amount of carbon sufficient to reduce the iron and silicon oxides is added with the ore to produce a melt containing 93 to 97 percent aluminum oxide, the electrical resistance of the melt is high enough to enable the melt to be maintained at a temperature of 2,000° C. or more. Thus the amount of carbon is sufficient to effect substantially complete reduction of the iron and silicon oxides without such excesses as would cause undesirable reduction of aluminum oxide or excessive waste of carbon by burning off. As a result, a relatively pure aluminum oxide is produced.

Now when the second increment of carbon is added after the first and major reduction reaction has been substantially completed, as represented by the addition of the second increment of carbon about ten hours after the initiation of the reaction by from two to several hours before the completion thereof, the free carbon added is able more effectively to seek out the remaining small amounts of silicon and iron oxides and other oxide impurities to effect their reduction without undesirably raising the concentration of carbon to such levels that it will cause material reduction of aluminum oxide, and without the $Al_2O_3$ content of the melt interferes with the ability to maintain the temperature of the melt above 2,000° C. for reaction and for pouring. In this way, it becomes possible to produce a melt maintained at a temperature above 2,000° C. and with a purity of at least 99.5 percent $Al_2O_3$, which bath can be poured from the furnace to enable the furnace to be reloaded while still hot for substantially continuous operation without loss and without interruption of electrical current flow. Thus, in Example 1, the carbon is added in two increments. The first increment of 8 kg. or 8 percent was added with the ore. The second increment of 2 kg. or 2 percent was added separate and apart from the ore a number of hours after the first increment and several hours before tapping. In Example 1, the 18 percent $Fe_2O_3$ and 7 percent $SiO_2$ would theoretically require about 7 percent carbon for reduction. Thus the increment of 8 percent carbon added with the ore was slightly in excess of that required for reduction of the $Fe_2O_3$ and $SiO_2$ content of the ore but not in excess of that required to reduce the remaining 7 percent impurities which would include a number of other metal oxides, such as titanium oxide, calcium oxide, magnesium oxide and the like. The added 2 percent raises the total of reducing carbon added to the desired excess for reaction with all of the oxide impurities, calculated stoichiometrically, thereby effectively to reduce the oxide impurities and leave a pure aluminum oxide.

As the reducing carbon, use can be made of pure carbon, such as pitch coke; however, metallurgical coke is likewise suitable because of its non-reducing impurities (lime and magnesia) which can be removed if they are harmful for the intended use.

Applicant has further established that, contrary to the known processes of manufacturing abrasive corundum at temperatures below 1950° C., it is necessary, in accordance with the practice of this invention, to obtain relatively pure aluminum oxide, to carry out the reduction at a temperature above 2000° C. and, preferably, of the order of 2100–2200° C. This operates to maintain a degree of fluidity in the molten bath suitable for the purification of the aluminum oxide.

Following the completion of the reduction phase, the molten bath of aluminum oxide will no longer contain undesirable amounts of the oxides of iron and/or silicon. Nevertheless, some fine globules of ferro-silicon alloy, formed by the reduction of the corresponding oxides, will often remain in suspension occluded in the bath. The major portion, in fact almost the entire quantity of said alloy, collects by settling (decantation) to the bottom of the furnace.

Applicant has found it possible substantially completely to eliminate the globules of ferro-silicon alloy by entrainment to carry the alloy to the bottom of the furnace by means of pure molten iron. The operation for carrying this out is delicate and should be conducted with care. It is important to avoid cooling the bath which would produce a lowering of its fluidity and thereby limit the effectiveness of the entire operation.

The iron which is used for the entrainment purpose can be obtained by fusion of non-oxidizing iron turnings. It is for this reason that the non-oxidized iron turnings are added both in Examples 1 and 2. In particular, it is desirable to avoid the addition of any iron compounds which, as a result of endothermic reduction, are susceptible to yielding iron since the addition of such compounds will lead to a harmful reduction of the temperature of the bath, as has been indicated.

According to a preferred embodiment of the invention, the addition of iron to the bath is carried out as follows:

The electrode is first freed of any adhering (surrounding) crusts and there is then placed on the surface of the liquid bath a heat-insulating layer of calcined alumina or powdered corundum, previously purified, as described in the examples. This layer should be sufficiently thick to avoid cooling of the upper surface of the bath. Generally, a thickness of 1.5–2 cms. will be sufficient. Thereupon, the bath is reheated for a few minutes with the application of the full power, and the iron turnings, as thick as possible, are then introduced in limited quantity, i.e., gradually, in order to avoid the sudden cooling of the bath and to obtain, by reason of the insulating layer, rapid fusion of the iron. The operation is repeated until the required quantity of turnings has been introduced to obtain optimum purification, namely, 5.5 kg.–6.5 kg. turnings per 100 kgs. of purified (refined) corundum.

If the insulating layer is entrained by the turnings, then it is desirable to re-form the layer before subsequent additions. According to the invention, there will thus be added a few percent by weight, preferably about 6 percent by weight, of iron turnings.

Following the last addition of turnings, the mass is permitted to settle for a few minutes and the purified (refined) corundum is tapped from the bath. Thus, for example, in a 150-kilowatt furnace which is capable of pouring 200 kgs. of purified corundum at one time, good results are obtained by observing the following time schedule:

| | |
|---|---|
| 0 hour | The electrode is removed and an insulating layer of grains of purified corundum (beads, particles) is placed in position. |
| From 0ʰ to 0ʰ .05 min. | Bath is reheated. |
| From 0ʰ .05 min. to 0ʰ 15 min. | 12 kgs. of iron turnings are introduced in two successive charges. |
| From 0ʰ 15 min. to 0ʰ 30 min. | Settling. |
| At 0ʰ 30 min. | Tapping. |

Referring now to the steps in Examples 1 and 2 of simultaneous removal of free carbon and aluminum carbide incident to the granulation of the melt while being poured, applicant's investigations have further established that it is possible to eliminate from the bath of the purified aluminum oxide the excess carbon and traces of formed aluminum carbide if the bath is submitted to a limited, control, and rapid oxidation by oxygen or by an oxygen-containing gas, such as air.

According to a preferred embodiment of the invention, the oxidation is carried out simultaneously with the spraying (atomization) of the liquid aluminum oxide into fine droplets by the action of air which is violently injected through the stream tapped from the bath.

The carbon particles are burned to carbon monoxide and the aluminum carbide is oxidized to alumina with liberation of carbon monoxide.

In practice, the bath of purified aluminum oxide will be tapped by tilting the furnace. The corundum is granulated by the action of a compressed air jet which subdivides the tapped stream into fine droplets and projects them across a tunnel formed, for example, of sheet aluminum which is water jacketed for cooling. In this manner, there will be obtained white, round, hollow beads of aluminum oxide of less than about 2 mm. in diameter. The furnace is then righted and a new cycle of operation can be commenced. The operation of the furnace is therefore substantially continuous, thus permitting economy in the expenditure of electrical energy by comparison with the batch process for the manufacture of abrasive corundum. The ferro-silicon which collects at the bottom of the furnace can be tapped periodically, such as every two days or predetermined multiples of the cycle.

Applicant has found further that it is possible to increase th fluidity of the aluminum oxide bath during the carbothermic reduction of aluminum ores by the addition of small quantities of magnesium oxide or a compound of magnesium capable of forming the oxide under the conditions existing, such for example as magnesium carbonate. The desired fluidity is achieved when the magnesium oxide or the magnesium oxide-forming component is added in amounts up to a few percent by weight and, preferably in an amount between 1–2 percent by weight, as illustrated in Example 2.

The reduction in viscosity of the bath facilitates settling of the impurities, such as ferro alloys, during the process. This makes it possible, when necessary, to add smaller quantities of iron turnings for the purpose of entraining the globules of ferro alloys suspended within the molten aluminum bath, as previously described.

According to the invention, it is possible to carry out the carbothermic treatment at an appreciably lower temperature while obtaining a degree of viscosity which enables satisfactory settling of the impurities. The oxide of magnesium or a compound of magnesium adapted to form the oxide under the operating conditions existing, can be added directly to the molten bath during the carbothermic treatment or, as in the preferred practice of this invention, the oxide and/or magnesium compound can be directly added to the charge introduced into the furnace for the carbothermic treatment, as in Example 2.

Many researches have further established that the magnesium oxide contained in the granulated corundum product can be eliminated, when desired, in whole or in part, by treatment with an aqueous acid, such as dilute hydrochloric acid.

The corundum obtained in accordance with the practice of this invention can be used either for the manufacture of refractory and heat-insulating materials, or as an intermediate in other manufactures, such for example as in the manufacture of aluminum.

The invention includes not only the method of manufacturing of pure aluminum oxide but also the novel product of a refined corundum of exceptional purity produced by the process of this invention.

The duration of the reduction phase of the process will vary with the size of the furnace and the composition of the ore. As a result, it is not possible to give specific directions that would be applicable to all instances. Merely by way of illustration, it can be mentioned that in the case of Example 1, which was carried out in a 150-kilowatt furnace, the reduction phase lasted 8–10 hours, while the two additional kilograms of carbon were added 1–2 hours before the furnace was tapped.

As will be apparent from the foregoing description, one of the important features of the present invention resides in the use of reduction temperatures of 2000° C. or above and, preferably, within the range of 2100–2200° C., which represents a temperature higher than that considered satisfactory hereto. As previously stated, the higher temperature increases the fluidity of the fused bath of alumina, thereby enhancing the entrainment and the settling of the impurities otherwise retained in the product. As disclosed, increased fluidity of the bath is also obtained by the addition of magnesium oxide. Thus, when this latter expedient is employed, it becomes possible to reduce the operating temperature to some extent and still obtain a corundum product of exceptional purity.

It will be understood that changes may be made in the details of formulation and operation without departing from the spirit of the invention, especially as defined in the following claims.

I claim:

1. In the process of producing relatively pure aluminum oxide from aluminum ores containing the oxides of silicon and iron as well as other metal oxides, the steps comprising preparing a charge of aluminum ore and reducing carbon by introducing said carbon in at least two separate stages, said charge being heated to a temperature above 2000° C. but below 2200° C., the carbon being introduced in admixture with the ore in the first stage in an amount of at least about the stoichiometric amount required for reduction of the iron and silicon oxides present in the ore, the amount of carbon introduced in the first stage being sufficient to provide a fused bath containing 93 to 97 percent by weight aluminum oxide, the carbon introduced in the second stage being introduced after the 93 to 97 percent range of aluminum oxide is achieved in said bath, the amount of carbon introduced in said second stage, when added to the reducing carbon previously introduced being in excess of the stoichiometric amount required for reaction with all the metal oxides present in the ore other than aluminum oxide, covering the fused bath with a heat insulating layer of alumina, adding iron metal to the fused bath through the heat insulating layer whereby the iron, when reduced to a molten state at the temperature of the bath sweeps occluded ferro-silicon alloy from the fused aluminum oxide to the bottom of the furnace, tapping the fused and refined aluminum oxide, quenching the aluminum oxide rapidly into water to cool it to a stabilized solid state, and directing a stream of oxygen-containing gas into the molten stream of refined aluminum oxide after tapping of said aluminum oxide and before quenching thereof to thereby oxidize carbon and aluminum carbide present in the molten stream of aluminum oxide and to break up the stream into fine particles.

2. A process in accordance with claim 1 including the step of eluting said particles with an acid to remove soluble impurities.

3. A process in accordance with claim 2 including the step of adding a magnesium compound to said fused bath prior to covering of the bath with said heat insulating layer, said compound being added in an amount up to 2 percent by weight of the ore and being selected from the group consisting of magnesium oxide and a magnesium compound thermally reducible to magnesium oxide, the addition of said compound during the heating step operating to increase the fluidity of the bath for allowing impurities of different specific gravity to separate gravitationally from the aluminum oxide to form separate layers.

References Cited in the file of this patent

UNITED STATES PATENTS

| | | |
|---|---|---|
| Re. 17,001 | Haglund | June 19, 1928 |
| 1,583,179 | Richmond et al. | May 4, 1926 |
| 1,787,124 | Siegens | Dec. 30, 1930 |
| 1,871,792 | Horsfield | Aug. 16, 1932 |
| 1,871,793 | Horsfield | Aug. 16, 1932 |
| 2,261,639 | Brenner et al. | Nov. 4, 1941 |